United States Patent
Nakagaito et al.

(10) Patent No.: US 9,739,340 B2
(45) Date of Patent: Aug. 22, 2017

(54) DAMPER APPARATUS

(71) Applicant: AISIN SEIKI KABUSHIKI KAISHA, Kariya-shi, Aichi (JP)

(72) Inventors: Satoshi Nakagaito, Kariya (JP); Tomohiro Saeki, Anjo (JP); Masaru Ebata, Chita (JP); Tsutomu Sekine, Kariya (JP); Masataka Sugiyama, Toyota (JP); Ryuji Ibaraki, Miyoshi (JP); Hiromichi Kimura, Okazaki (JP); Hiroaki Kimura, Toyota (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/777,112

(22) PCT Filed: Mar. 5, 2014

(86) PCT No.: PCT/JP2014/055684
§ 371 (c)(1),
(2) Date: Sep. 15, 2015

(87) PCT Pub. No.: WO2014/174910
PCT Pub. Date: Oct. 30, 2014

(65) Prior Publication Data
US 2016/0033002 A1    Feb. 4, 2016

(30) Foreign Application Priority Data

Apr. 25, 2013  (JP) .................. 2013-092980

(51) Int. Cl.
*F16F 15/129* (2006.01)
*F16F 15/139* (2006.01)
*F16F 15/123* (2006.01)

(52) U.S. Cl.
CPC .......... *F16F 15/129* (2013.01); *F16F 15/123* (2013.01); *F16F 15/1395* (2013.01)

(58) Field of Classification Search
CPC ............................. F16F 15/129; F16F 15/139
(Continued)

(56) References Cited

U.S. PATENT DOCUMENTS

| | | | | |
|---|---|---|---|---|
| 3,809,198 A | * | 5/1974 | Mori ..................... | F16F 15/127 464/68.41 X |
| 4,285,423 A | * | 8/1981 | Fadler ................... | F16F 15/129 192/213.31 |

(Continued)

FOREIGN PATENT DOCUMENTS

| | | |
|---|---|---|
| JP | 4-125316 A | 4/1992 |
| JP | 2012-097841 A | 5/2012 |

(Continued)

OTHER PUBLICATIONS

International Search Report (PCT/ISA/210) mailed on Jun. 10, 2014, by the Japanese Patent Office as the International Searching Authority for International Application No. PCT/JP2014/055684.

(Continued)

*Primary Examiner* — Gregory Binda
(74) *Attorney, Agent, or Firm* — Buchanan Ingersoll & Rooney PC

(57) ABSTRACT

A damper apparatus according to an embodiment includes a pair of first plates, a second plate, an elastic member, a first friction material and a second friction material. The elastic member is configured to elastically deform in a circumferential direction of a rotation axis by a relative rotation between the pair of first plates and the second plate around the rotation axis. The first friction material is configured to generate a first friction torque in a case where the second plate rotates relative to the pair of first plates in a first (Continued)

direction from an initial state. The second friction material is configured to generate a second friction torque greater than the first friction torque in a case where the second plate rotates relative to the pair of first plates in a second direction which is opposite from the first direction from the initial state.

5 Claims, 7 Drawing Sheets

(58) Field of Classification Search
USPC .......... 464/68.4, 68.41; 192/213.11, 213.12, 192/213.21, 213.22, 213.3–214.1
See application file for complete search history.

(56) References Cited

U.S. PATENT DOCUMENTS

| | | | | |
|---|---|---|---|---|
| 4,573,945 | A * | 3/1986 | Kajitani | F16F 15/12366 192/213.31 |
| 4,928,805 | A * | 5/1990 | Takeuchi | F16F 15/129 192/213.31 |
| 8,414,404 | B2 * | 4/2013 | Takenaka | F16F 15/129 464/68.4 X |
| 9,091,304 | B2 * | 7/2015 | Takenaka | F16F 15/129 464/68.4 |
| 2012/0234642 | A1 | 9/2012 | Sekine et al. | |
| 2014/0087890 | A1 | 3/2014 | Komuro et al. | |
| 2014/0323232 | A1 | 10/2014 | Nakagaito et al. | |
| 2015/0184718 | A1 * | 7/2015 | Sugiyama | F16F 15/139 464/68.4 |

FOREIGN PATENT DOCUMENTS

| | | | |
|---|---|---|---|
| JP | 2012-193773 A | | 10/2012 |
| WO | WO 2012/104926 A1 | * | 8/2012 |
| WO | WO 2014/053899 A1 | | 4/2014 |

OTHER PUBLICATIONS

International Search Report (PCT/ISA/210) mailed on Jun. 10, 2014, by the Japanese Patent Office as the International Searching Authority for International Application No. PCT/JP2014/055684.
Written Opinion (PCT/ISA/237) mailed on Jun. 10, 2014, by the Japanese Patent Office as the International Searching Authority for International Application No. PCT/JP2014/055684 and English translation of the Written Opinion.

* cited by examiner

DAMPER APPARATUS

TECHNICAL FIELD

An embodiment of the present invention relates to a damper apparatus.

BACKGROUND ART

Conventionally, a damper apparatus including a pair of first plates rotating around a rotation axis, a second plate including a portion positioned between the pair of first plates and a friction material generating a friction torque (resistance torque) in a case where the pair of first plates and the second plate rotate relative to each other around the rotation axis is known (for example, refer to Patent document 1).

DOCUMENT OF PRIOR ART

Patent Document

Patent document 1: JP2012-193773A

OVERVIEW OF INVENTION

Problem to be Solved by Invention

In a vehicle including the aforementioned known damper apparatus, while relatively large vibration or noise may be generated at a start of an engine, relatively small vibration or noise may be generated during a normal operation (normal driving) after the engine start. Thus, it may be significant to generate a friction torque of which magnitude varies depending on circumstances.

Means For Solving Problem

A damper apparatus according to an embodiment, for example, includes a pair of first plates arranged at a position where the pair of first plates is away from each other in an axial direction of a rotation axis, the pair of first plates being configured to be rotatable around the rotation axis in a state where the pair of first plates intersects with the rotation axis, a second plate including a portion which is positioned at an inner side of the pair of first plates and configured to be rotatable around the rotation axis in a state where the second plate intersects with the rotation axis, an elastic member elastically deforming in a circumferential direction of the rotation axis by a relative rotation between the pair of first plates and the second plate around the rotation axis, a first friction material generating a first friction torque in a case where the second plate rotates relative to the pair of first plates in a first direction from an initial state, and a second friction material generating a second friction torque greater than the first friction torque in a case where the second plate rotates relative to the pair of first plates in a second direction which is opposite from the first direction from the initial state. Accordingly, as an example, the friction torque of which magnitude varies depending on circumstances may be generated.

The aforementioned damper apparatus, for example, further includes a third plate arranged between the first friction material and the second friction material and configured to be rotatable around the rotation axis in a state where the third plate intersects with the rotation axis. The second plate and the third plate are inhibited from integrally rotating each other and the first friction torque is generated by a friction of the first friction material in a case where the second plate rotates relative to the pair of first plates in the first direction from the initial state. The second plate and the third plate integrally rotate each other and the second friction torque is generated by a friction of the second friction material in a case where the second plate rotates relative to the pair of first plates in the second direction from the initial state. Accordingly, as an example, the friction torque of which magnitude varies depending on circumstances may be generated by the usage of the third plate between the first friction material and the second friction material.

According to the aforementioned damper apparatus, for example, the first friction material is arranged between the third plate and the second plate and the second friction material is arranged between the third plate and the first plate. The second plate and the third plate are inhibited from integrally rotating each other and the first friction torque is generated by a friction between the first friction material and the second plate each other in a case where the second plate rotates relative to the pair of first plates in the first direction from the initial state. The second plate and the third plate integrally rotate each other and the second friction torque is generated by a friction between the second friction material and the third plate each other in a case where the second plate rotates relative to the pair of first plates in the second direction from the initial state. Accordingly, as an example, the friction torque of which magnitude varies depending on circumstances may be generated by the friction between the first friction material and the second plate (the second friction material and the third plate) each other depending on the circumstances.

According to the aforementioned damper apparatus, for example, the third plate includes a pair of third plates provided at opposite sides of the second plate in the axial direction of the rotation axis, the first friction material includes a pair of first friction materials provided at opposite sides of the second plate in the axial direction of the rotation axis, and the second friction material includes a pair of second friction materials provided at the opposite sides of the second plate in the axial direction of the rotation axis. Accordingly, as an example, the friction torque of which magnitude varies depending on circumstances may be generated by the pair of third plates, the pair of first friction materials and the pair of second friction materials provided at the opposite sides in the axial direction of the rotation axis.

According to the aforementioned damper apparatus, for example, the pair of third plates is connected in a state being away from each other in the axial direction by a connecting member including an axially extending portion, and an opening portion including an end surface at an inner side is formed at a portion of the second plate facing the connecting member, the end surface being contactable with the axially extending portion of the connecting member. Accordingly, as an example, in a case where the axially extending portion of the connecting member and the end surface at the inner side of the opening portion make contact with each other, the second plate and the third plate may easily integrally rotate each other.

The aforementioned damper apparatus, as an example, further includes a fourth plate configured to rotate integrally with the pair of first plates around the rotation axis, the fourth plate including a portion positioned at an outer side in a radial direction of the rotation axis relative to the elastic member, the portion being connected to an exterior portion, and a torque limiter portion connected to a portion of the second plate, the portion being positioned at the outer side in the radial direction relative to the elastic member. Accordingly, as an example, in a construction where the second plate is connected to the exterior portion and the torque limiter portion is connected to the fourth plate, the friction torque of which magnitude varies depending on circumstances may be generated.

MODE FOR CARRYING OUT THE INVENTION

In the following, an embodiment is explained with reference to drawings.

First, a construction of a damper apparatus 100 according to the embodiment is explained with reference to FIGS. 1 to 9. The damper apparatus 100 is arranged between an engine (power unit: not illustrated) and a transmission (transmission apparatus: not illustrated). The damper apparatus 100 includes a function to absorb (reduce) a fluctuation of a driving force (torque difference).

Figure 1:
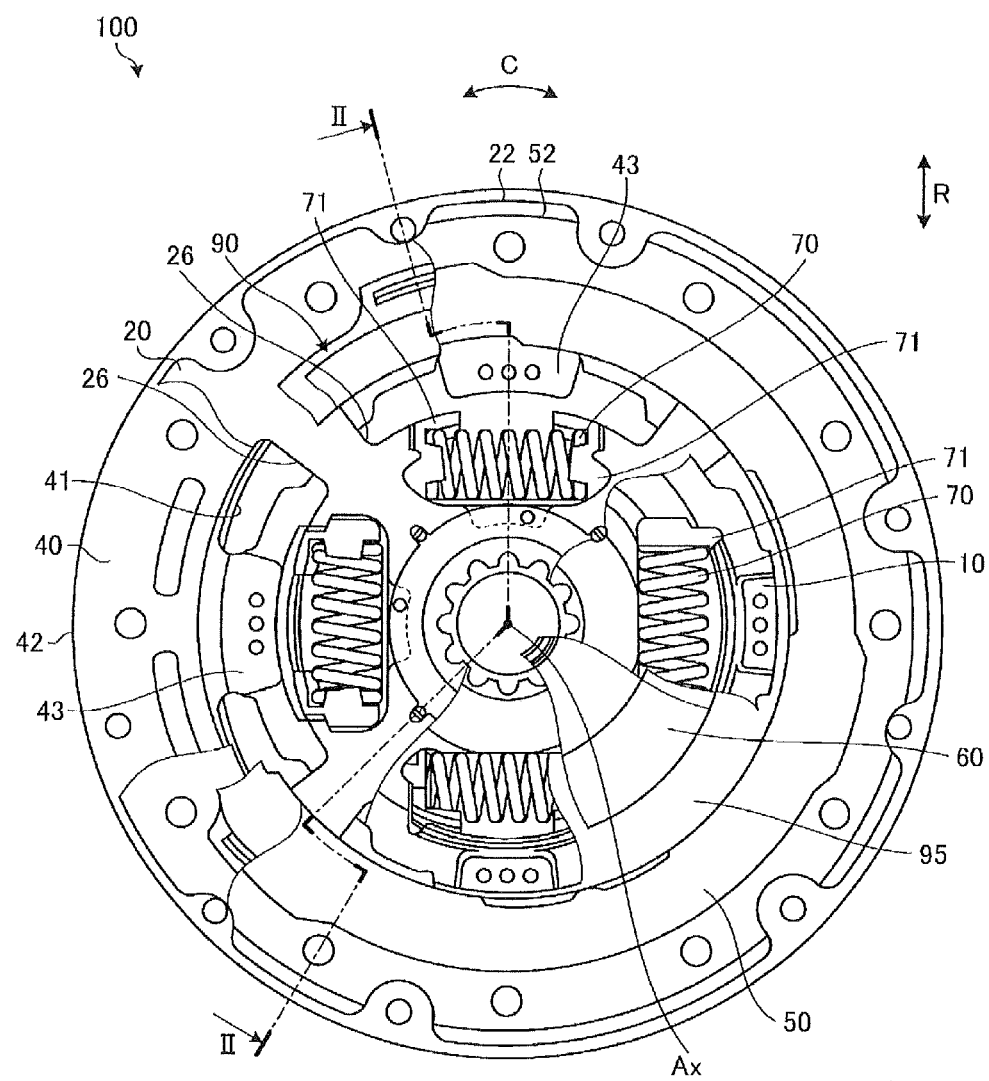
FIG. 1 is a diagram illustrating an entire construction of an example of a damper apparatus according to an embodiment.
Figure 2:
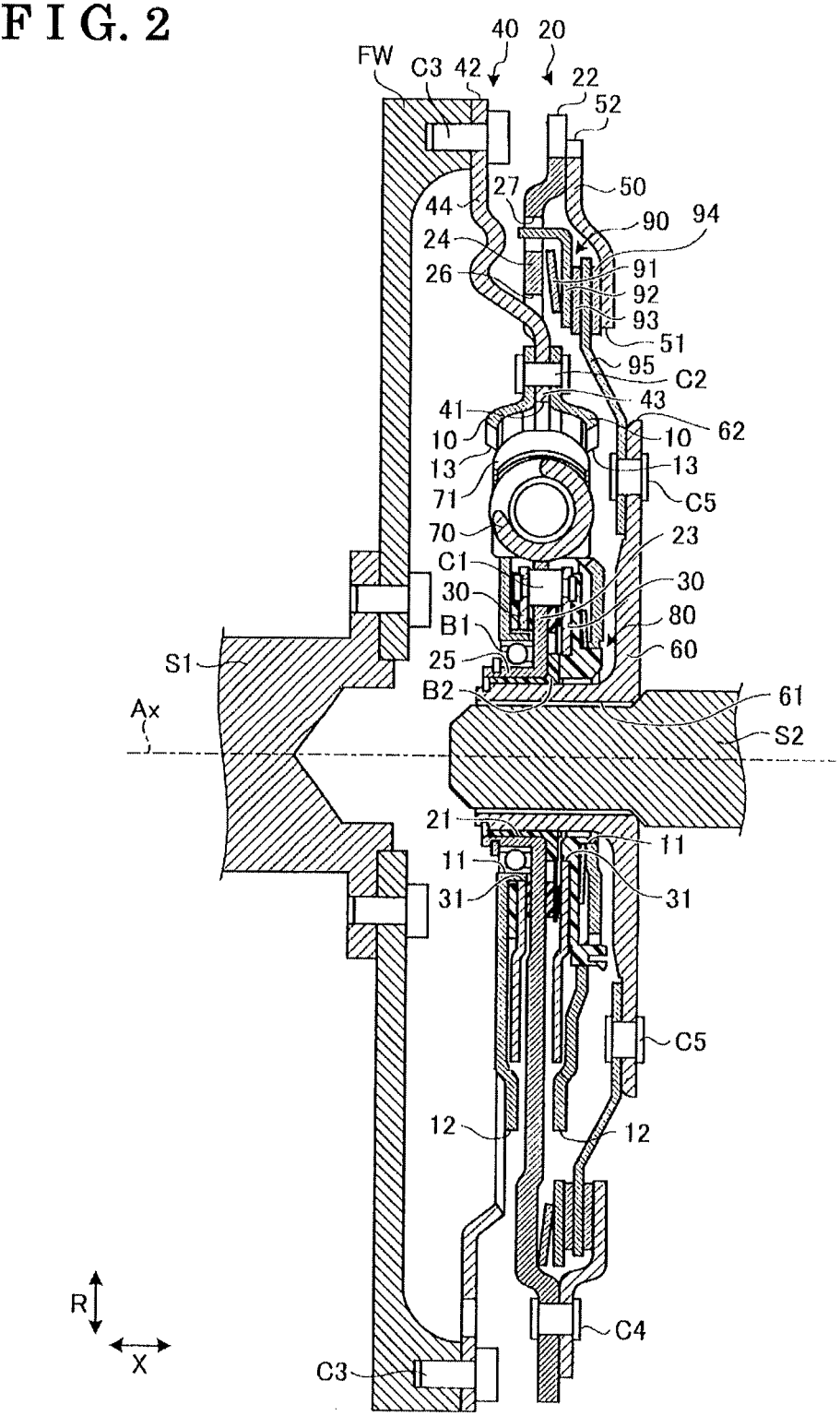
FIG. 2 is a cross-sectional view taken along a line II-II in FIG. 1.

As illustrated in FIGS. 1 and 2, the damper apparatus 100 includes plural plate-shaped members (a first plate 10, a second plate 20, a third plate 30, a fourth plate 40, a fifth plate 50, a sixth plate 60 and the like) configured to be rotatable (rotatably movable) around a rotation axis Ax in a state where each of the plural plate-shaped members intersects with the rotation axis Ax. The aforementioned plural plate-shaped members are formed of metal, for example. In the following, an explanation is made in a state where a direction (direction X) where the rotation axis Ax extends is an axial direction, a direction (direction R) that intersects with the rotation axis Ax is a radial direction, and a rotation direction (direction C) around the rotation axis Ax is a circumferential direction. In FIG. 1, illustrations of connecting members C1, C2, C3, C4 and C5, for example, which are explained later, are omitted. FIG. 1 is a diagram (cutaway view) where the damper apparatus 100 illustrated in FIG. 2 is viewed from one side in the axial direction (right side in FIG. 2).

As illustrated in FIGS. 1 and 2, the damper apparatus 100 includes elastic members 70 which absorb (tentatively store) a torque difference by elastically deforming (expanding and contracting) in the circumferential direction. The elastic members 70 are configured by coil springs or the like. The four elastic members 70 are provided to be spaced away from one another (substantially at even intervals) along the circumferential direction. As illustrated in FIG. 1, each of the elastic members 70 is supported at opposite sides in the circumferential direction by a pair of support members 71 made of resin, for example. The elastic member 70 and the pair of support members 71 are provided between the first plate 10 and the second plate 20 (between a pair of first plates 10 and at an inner side of an opening portion 26, which is explained later, of the second plate 20).

Figure 3:
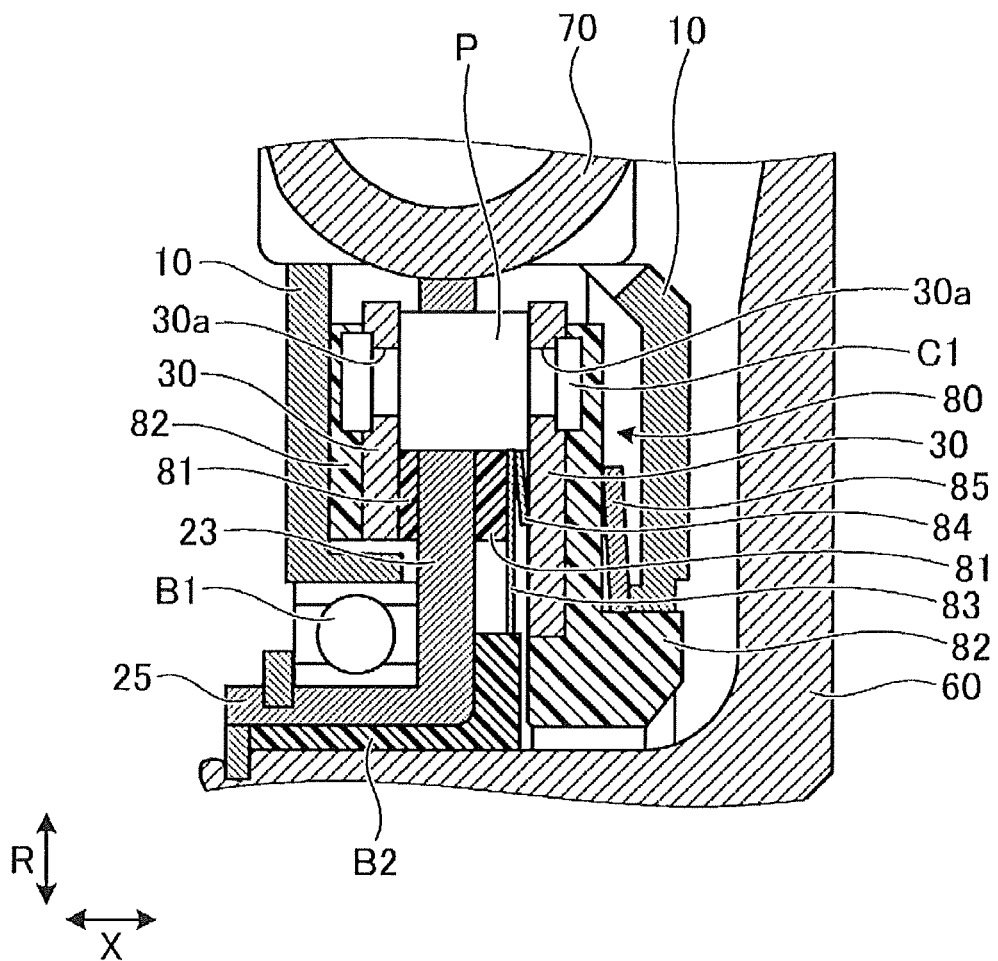
FIG. 3 is an enlarged cross-sectional view which is an enlarged illustration of an example of a hysteresis mechanism portion illustrated in FIG. 2.

As illustrated in FIGS. 2 and 3, the first plates 10 as a pair are provided at opposite sides of the elastic members 70 in the axial direction. The pair of first plates 10 is positioned to be spaced away from each other in the axial direction. Each of the pair of first plates 10 includes an annular form including an inner circumferential portion 11 and an outer circumferential portion 12 when viewed from the axial direction. As illustrated in FIG. 2, a portion of each of the pair of first plates 10 facing the elastic member 70 is formed with an opening portion 13. An inner end surface of the opening portion 13 is configured to be contactable with a circumferential end portion of the support member 71.

As illustrated in FIGS. 1 to 4, the second plate 20 includes an annular form including an inner circumferential portion 21 and an outer circumferential portion 22 when viewed from the axial direction. The second plate 20 includes a first portion 23 positioned at an inner side of the pair of first plates 10, a second portion 24 (a portion including the outer circumferential portion 22) positioned at the outer side of the pair of first plates 10, and a third portion 25 (a portion including the inner circumferential portion 21) extending to the other side in the axial direction (left side in FIG. 2) from an inner end portion of the first portion 23 in the radial direction.

Figure 4:
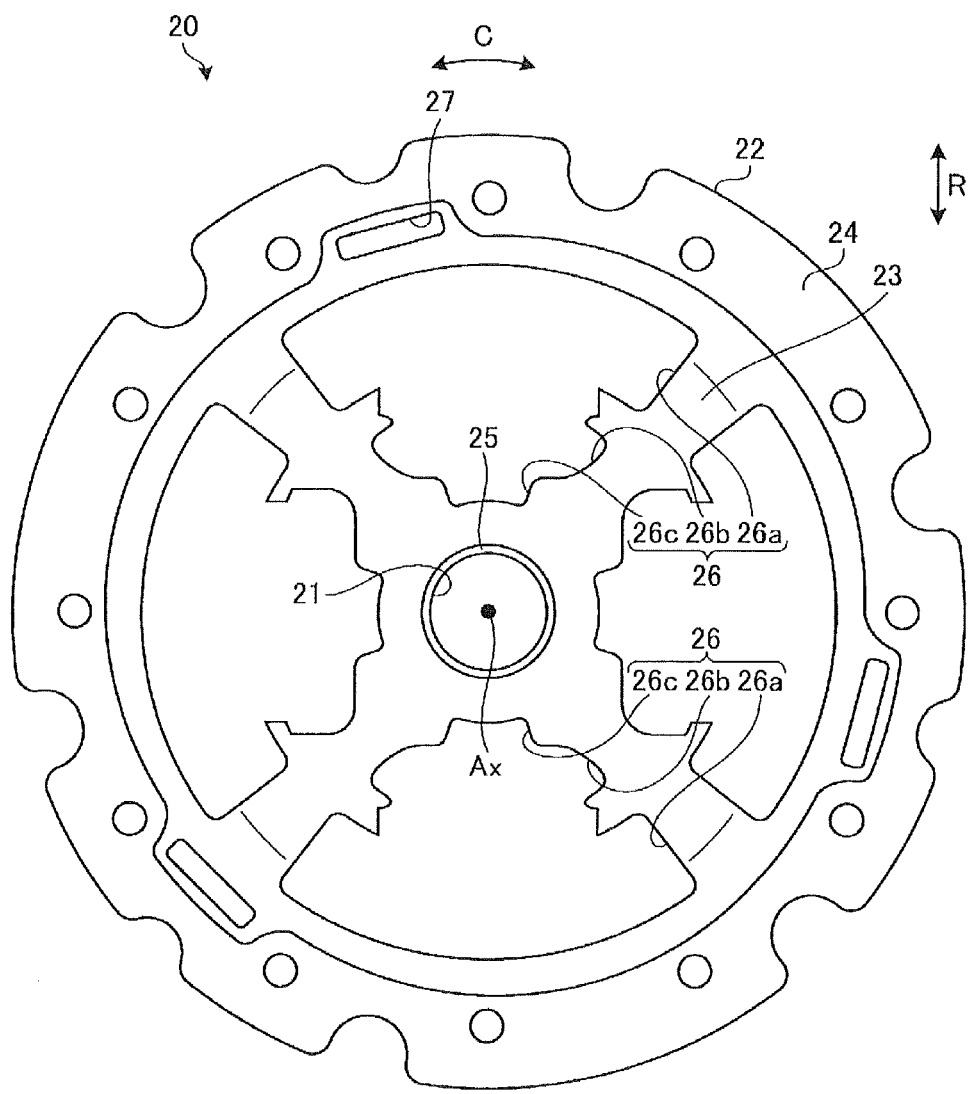
FIG. 4 is a diagram illustrating an entire construction of an example of a second plate of the damper apparatus according to the embodiment.

As illustrated in FIGS. 2 and 4, the opening portions 26 are formed at an intermediate portion of the second plate 20 in the radial direction. The opening portion 26 is formed to extend over the first portion 23 and the second portion 24 of the second plate 20. The opening portion 26 includes a first opening portion 26a where a first portion 43, which is explained later, of the fourth plate 40 is positioned and a second opening portion 26b where the elastic member 70 and the support members 71 are positioned. An opening portion 27 is formed at a portion of the second plate 20 closer to the outer circumferential portion 22 than the opening portion 26 so that a plate-shaped member 92 of a torque limiter portion 90 which is explained later is positioned.

In the present embodiment, as illustrated in FIGS. 2 and 3, the damper apparatus 100 includes a hysteresis mechanism portion (friction torque generation mechanism portion, resistance torque generation mechanism portion) 80 that reduces vibration or noise by generating a hysteresis torque (friction torque, resistance torque) in a case where the first plate 10 and the second plate 20 rotate relative to each other around the rotation axis Ax. As illustrated in FIG. 3, the hysteresis mechanism portion 80 is provided between the first plate 10 and the second plate 20 and at the radially inner side of the elastic members 70. The hysteresis mechanism portion 80 includes friction materials 81, 82, a plate-shaped member 83, disc springs 84, 85 and the third plate 30. The friction materials 81 and 82 are examples of a "first friction material" and a "second friction material" respectively.

The friction materials 81 and 82 are provided between the first plates 10 and the first portion 23, which is explained later, of the second plate 20. The first and second friction materials 81 and 82 are provided at the respective sides of the first portion 23 of the second plate 20 in the axial direction. Specifically, the friction material 81 is provided in surface contact with a surface at an outer side of the first portion 23, which is explained later, of the second plate 20 in the axial direction and in surface contact with a surface at an inner side of the plate-shaped member 83 in the axial direction. The friction material 82 is provided in surface contact with a surface at an outer side of the third plate 30 in the axial direction.

In the present embodiment, the friction materials 81 and 82 are configured to generate hysteresis torques with different magnitudes from each other. For example, the friction materials 81 and 82 are formed of materials including different friction coefficients from each other. That is, in the present embodiment, as an example, the friction material 81 is formed of a material including a smaller friction coefficient than the friction material 82. Accordingly, the hysteresis torque generated by friction between the friction material 81 and the surface at the axially outer side of the first portion 23 of the second plate 20 (in a case of FIG. 7 which is explained later) is smaller than the hysteresis torque generated by friction between the friction material 82 and the surface at the axially outer side of the third plate 30 (in a case of FIG. 8 which is explained later).

As illustrated in FIG. 3, the plate-shaped member 83 is disposed between the friction material 81 that is provided at one side in the axial direction (right side in FIG. 3) relative to the second plate 20 and the third plate 30. The disc spring 84 is disposed between the plate-shaped member 83 and the third plate 30 so as to be configured to bias the plate-shaped member 83 towards the friction material 81. The disc spring 85 is disposed between the friction material 82 that is provided at one side in the axial direction relative to the second plate 20 and the first plate 10 so as to be configured to bias the friction material 82 towards the third plate 30.

Figure 5:
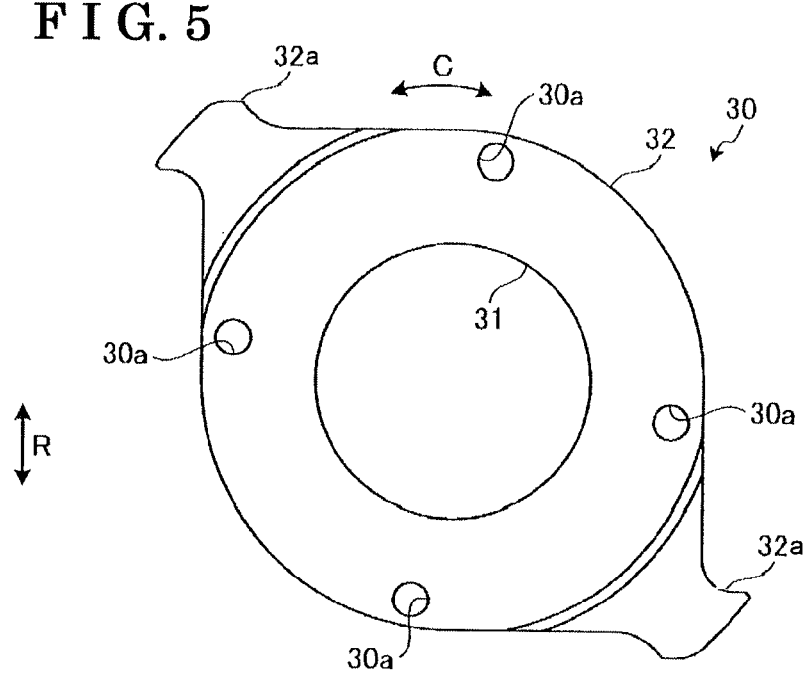
FIG. 5 is a diagram illustrating an entire construction of an example of a third plate of the damper apparatus according to the embodiment.

As illustrated in FIG. 5, the third plate 30 includes a substantially annular form including an inner circumferential portion 31 and an outer circumferential portion 32 when viewed in the axial direction. The third plate 30 may include two projections 32a as illustrated in FIG. 5. In addition, two of the third plates 30 in total are provided at respective sides in the axial direction of the first portion 23 of the second plate 20 respectively. Two of the third plates 30 are disposed between the friction materials 81 and 82. Two of the third plates 30 are connected to each other in a state being spaced away from each other in the axial direction by the connecting member C1 (for example, a rivet in FIG. 3) including an axially extending portion P. A penetration bore 30a is formed at each of the two third plates 30 so that the axially extending portion P of the connecting member C1 is inserted to be positioned within the penetration bore 30a. Accordingly, two of the third plates 30 are configured to be integrally rotatable each other around the rotation axis Ax in a state intersecting with the rotation axis Ax.

Specifically, a cut portion 26c is formed at a portion of the opening portion 26 of the second plate 20 facing the connecting member C1. An inner end surface of the cut portion 26c and an outer peripheral surface of the axially extending portion P of the connecting member C1 are configured to be contactable (to face in the circumferential direction) with each other. Accordingly, in a state where the inner end surface of the cut portion 26c and the outer peripheral surface of the axially extending portion P of the connecting member C1 are in contact with each other, the pair of third plates 30 connected by the connecting member C1 rotates together with the second plate 20 around the rotation axis Ax when the second plate 20 rotates relative to the first plate 10 (fourth plate 40) around the rotation axis Ax (in a case of FIG. 8 which is explained later). The cut portion 26c is an example of an "opening portion". As illustrated in FIG. 4, the cut portion 26c is continuously formed to a portion of the second opening portion 26b facing the inner circumferential portion 21.

Figure 6:
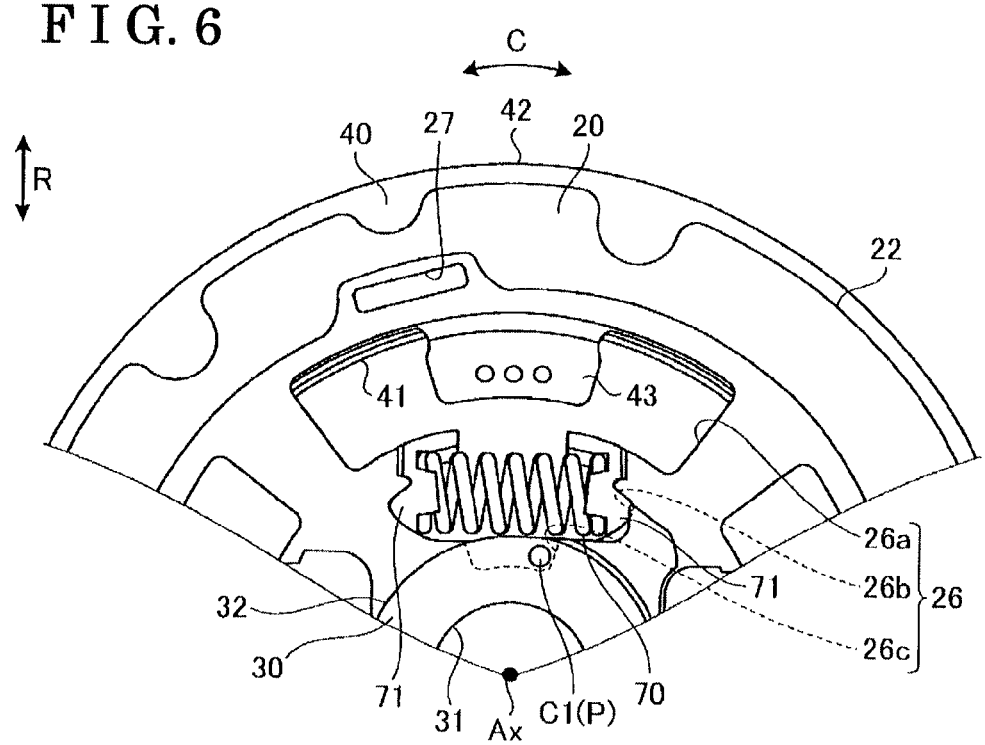
FIG. 6 is a schematic view illustrating an example of an initial state of the damper apparatus according to the embodiment.
Figure 7:
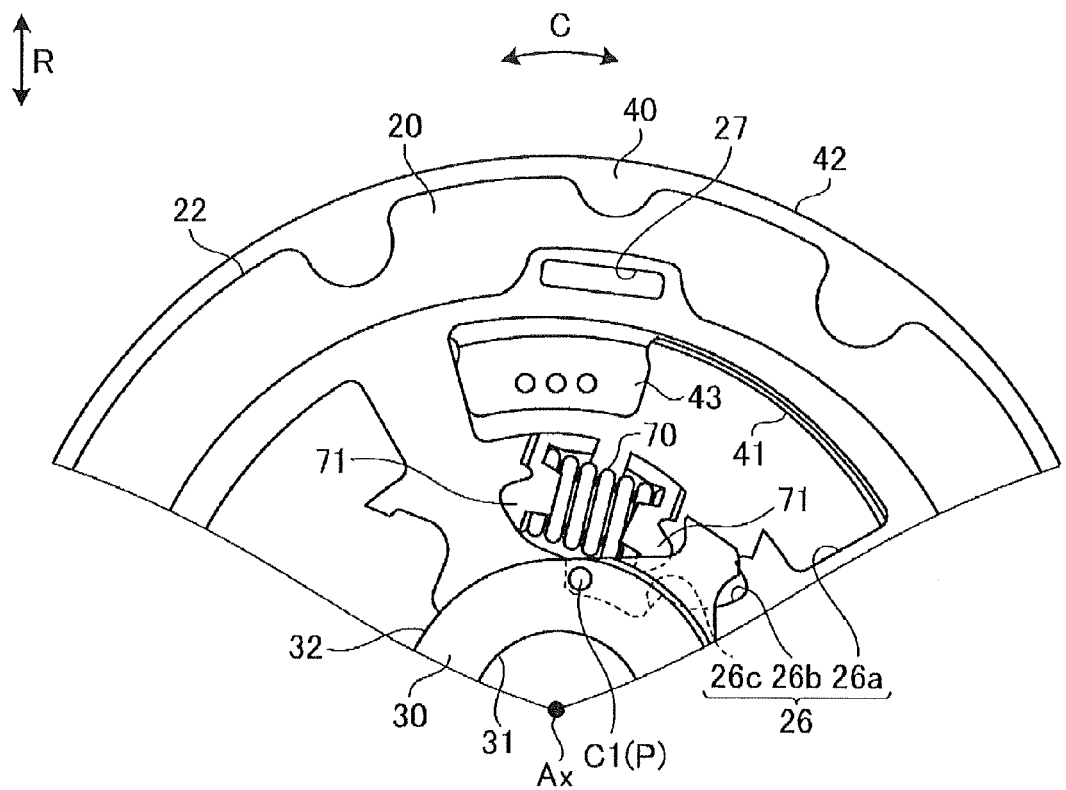
FIG. 7 is a schematic view illustrating an example of a state where a first hysteresis torque is generated in the damper apparatus according to the embodiment.
Figure 8:
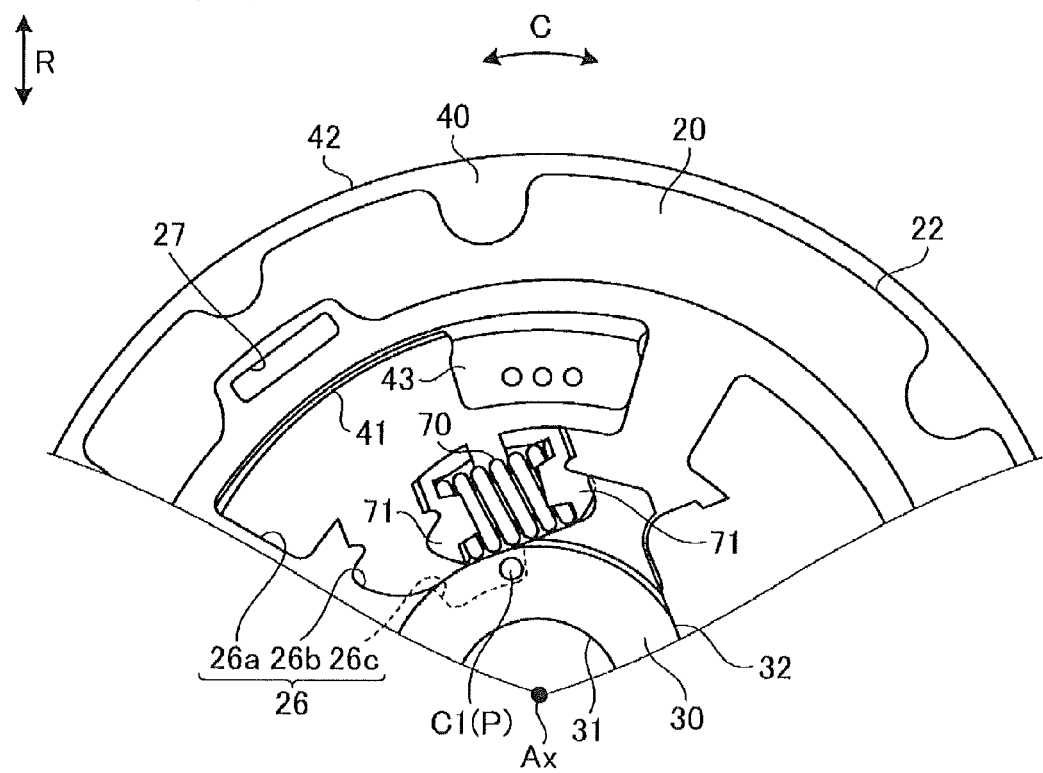
FIG. 8 is a schematic view illustrating an example of a state where a second hysteresis torque is generated in the damper apparatus according to the embodiment.

Here, as illustrated in FIG. 6, the axially extending portion P of the connecting member C1 is provided at a position away from an end surface of the cut portion 26c at one side in the circumferential direction (side in a counterclockwise direction in FIG. 6) and also at a position in the vicinity of an end surface of the cut portion 26c at the other side in the circumferential direction (side in a clockwise direction in FIG. 6) in an initial state where the second plate 20 does not rotate relative to the first plate 10 (fourth plate 40) around the rotation axis Ax. Accordingly, as illustrated in FIG. 7, in a case where the second plate 20 rotates relative to the first plate 10 (fourth plate 40) in a predetermined first direction (in a clockwise direction in FIG. 7) around the rotation axis Ax from the initial state (see FIG. 6), the inner end surface of the cut portion 26c and the axially extending portion P of the connecting member C1 are inhibited from making contact with each other and the second plate 20 and the third plate 30 are configured not to rotate integrally (the second plate 20 rotates relative to the third plate 30). In addition, as illustrated in FIG. 8, in a case where the second plate 20 rotates relative to the first plate 10 (fourth plate 40) in a predetermined second direction (in a counterclockwise direction in FIG. 8) around the rotation axis Ax from the initial state (see FIG. 6), the inner end surface of the cut portion 26c and the axially extending portion P of the connecting member C1 make contact with each other and the second plate 20 and the third plates 30 are configured to rotate integrally. The case where the second plate 20 rotates relative to the first plate 10 in the first direction corresponds to a normal operation (normal driving such as acceleration, for example) of the engine (not illustrated) after the start thereof, for example, and the case where the second plate 20 rotates relative to the first plate 10 in the second direction corresponds to the start of the engine.

Figure 9:
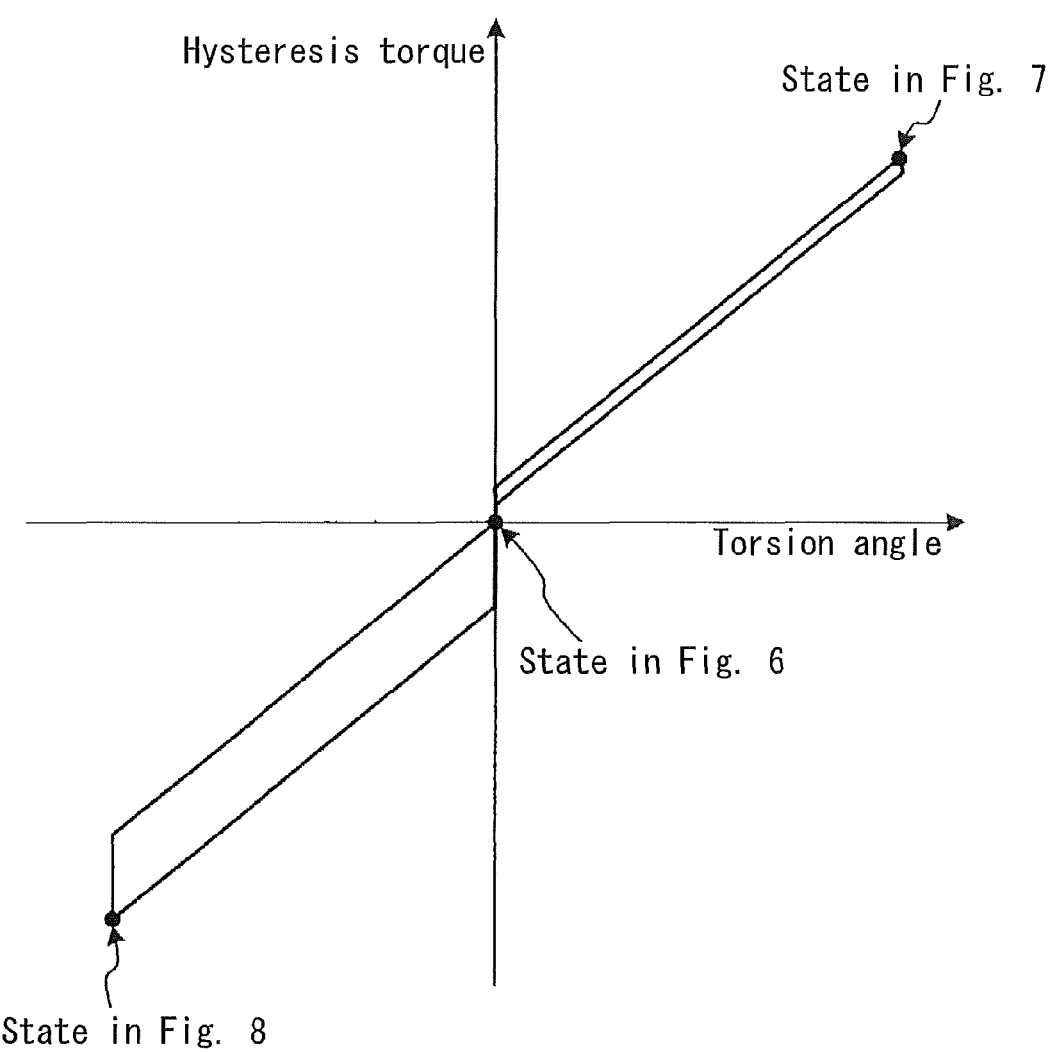
FIG. 9 is a diagram illustrating an example of a relation between a hysteresis torque and a torsion angle generated at the hysteresis mechanism portion of the damper apparatus according to the embodiment.

According to the aforementioned construction, in the present embodiment, as illustrated in FIG. 9, the second plate 20 and the third plate 30 are inhibited from rotating integrally in a case where the second plate 20 rotates relative to the first plate 10 in the first direction around the rotation axis Ax from the initial state (see FIG. 6) (for example, at the normal operation after the start of the engine (not illustrated): see FIG. 7), and a first hysteresis torque is generated by the friction between the friction material 81 and the first portion 23 of the second plate 20. In addition, the second plate 20 and the third plate 30 rotate integrally in a case where the second plate 20 rotates relative to the first plate 10 in the second direction around the rotation axis Ax from the initial state (see FIG. 6) (for example, at the start of the engine: see FIG. 8), and a second hysteresis torque greater than the first hysteresis torque is generated by the friction between the friction material 82 and the third plate 30. In FIG. 9, a rotation angle (torsion angle) of the second plate 20 in a case where the second plate 20 rotates relative to the first plate 10 in the first direction is indicated at a positive side while the rotation angle (torsion angle) of the second plate 20 in a case where the second plate 20 rotates relative to the first plate 10 in the second direction is indicated at a negative side.

In the present embodiment, as illustrated in FIGS. 1 and 2, the fourth plate 40 includes an annular form including an inner circumferential portion 41 and an outer circumferential portion 42 when viewed in the axial direction. The fourth plate 40 includes the first portion 43 positioned at the inner side of the opening portion 26 of the second plate 20 and a second portion 44 positioned at the outer side (outer side relative to the elastic member 70 in the radial direction) of the opening portion 26 of the second plate 20.

As illustrated in FIG. 1, the first portion 43 includes a predetermined width in the circumferential direction and extends in the radial direction. As illustrated in FIG. 2, the first portion 43 is connected to the pair of first plates 10 by the connecting member C2 (for example, a rivet in FIG. 2) in a state where the first portion 43 is sandwiched from the opposite sides in the axial direction by the pair of first plates 10. A portion of the second portion 44 at the outer side in the radial direction relative to the elastic member 70 is mounted to an exterior portion (a flywheel FW attached to a shaft S1 at an output side of the engine (not illustrated)) by the connecting member C3 (for example, a rivet in FIG. 2).

Here, the first portion 43 is configured to be contactable with an inner end surface of the opening portion 26 of the second plate 20. Specifically, as illustrated in FIGS. 7 and 8, an end surface of the first portion 43 in the circumferential direction and an inner end surface of the first opening portion 26a of the opening portion 26 in the circumferential direction are configured to make contact with each other in a case where the first plate 10 and the fourth plate 40, and the second plate 20 rotate relative to each other around the rotation axis Ax. Accordingly, the first portion 43 is configured to function as a stopper portion that restricts a range of the relative rotation between the first plate 10 and the fourth plate 40, and the second plate 20 around the rotation axis Ax.

That is, as illustrated in FIG. 6, in the initial state where the elastic member 70 is inhibited from contracting (state where a torque difference is not generated between the first plate 10 and the third plate 30, and the second plate 20), the circumferential end surface of the first portion 43 and the inner end surface of the opening portion 26 (first opening portion 26a) are disposed at a position away from each other. As illustrated in FIGS. 7 and 8, in a state where the elastic member 70 maximally contracts (state where a large torque difference is generated between the first plate 10 and the third plate 30, and the second plate 20), the circumferential end surface of the first portion 43 and the inner end surface of the opening portion 26 (first opening portion 26a) are configured to make contact with each other. In FIGS. 6 to 8, for the purpose of simplification, only the second plate 20, the third plate 30, the connecting member C1, the fourth plate 40, the elastic member 70 and the support members 71 are schematically illustrated and the other members are omitted.

As illustrated in FIG. 2, the inner circumferential portion 11 of the first plate 10 arranged at the other side in the axial direction (left side in FIG. 2) in the pair of first plates 10 is connected to the third portion 25 of the second plate 20 via a bearing (rolling bearing) B1. Accordingly, the first plates 10 and the second plate 20 are configured to rotate relative to each other around the rotation axis Ax. In addition, as illustrated in FIG. 2, the pair of first plates 10 is connected to the first portion 43 of the fourth plate 40 by the connecting member C2. Accordingly, the first plates 10 and the fourth plate 40 are configured to integrally rotate around the rotation axis Ax.

The third portion 25 of the second plate 20 is connected to a portion of the sixth plate 60 including an inner circumferential portion 61 via a sliding bearing B2 formed by a resin-made bush, for example. The second portion 24 of the second plate 20 is connected to a portion of the sixth plate 60 including an outer circumferential portion 62 via the fifth plate 50 and the torque limiter portion 90 (connection plate 95) which is explained later. Accordingly, in a case where a slippage occurs at the torque limiter portion 90, the second plate 20 and the sixth plate 50 rotate relative to each other around the rotation axis Ax. In a case where a slippage does not occur at the torque limiter portion 90, the second plate 20 and the sixth plate 60 are configured to rotate integrally around the rotation axis Ax.

In the present embodiment, as illustrated in FIG. 2, the damper apparatus 100 includes the torque limiter portion 90 that absorbs (reduces) a torque difference by generating a slippage in a case where the torque difference equal to or greater than a predetermined value occurs. The torque limiter portion 90 is provided at the radially outer side of the elastic members 70 so as to overlap the elastic members 70 when viewed in the radial direction. Specifically, the elastic members 70 are provided at the radially inner side relative to the first portion 43 of the fourth plate 40 and the torque limiter portion 90 is provided at the radially outer side relative to the first portion 43 of the fourth plate 40.

The torque limiter portion 90 includes a disc spring 91, the plate-shaped member 92, two friction materials 93, 94, and the connection plate 95. The disc spring 91, the plate-shaped member 92, the friction materials 93, 94 and the connection plate 95 are arranged to be sandwiched between the second plate 20 and the fifth plate 50 which are connected to each other by the connecting member C4 (for example, a rivet in FIG. 2). The fifth plate 50 includes an annular form including an inner circumferential portion 51 and an outer circumferential portion 52 when viewed in the axial direction.

The disc spring 91 is configured to bias the plate-shaped member 92 towards the friction material 93. The connection plate 95 is disposed to be sandwiched between the two friction materials 93 and 94. A radially inner portion of the connection plate 95 is connected to the sixth plate 60 by the connecting member C5 (for example, a rivet in FIG. 2). The sixth plate 60 includes an annular form including the inner circumferential portion 61 and the outer circumferential portion 62 when viewed in the axial direction. A shaft S2 provided at an input side of the transmission (not illustrated) is inserted to be positioned at an inner side of the inner circumferential portion 61 of the sixth plate 60. Specifically, an engagement structure such as a spline, for example, is provided at each of the inner circumferential portion 61 of the sixth plate 60 and an outer peripheral surface of the shaft S2 so that the inner circumferential portion 61 of the sixth plate 60 and the shaft S2 are fixed to each other via the aforementioned engagement structures.

As explained above, the damper apparatus 100 (hysteresis mechanism portion 80) according to the embodiment is configured, as an example, to generate the first hysteresis torque (refer to a region at the positive side of the horizontal axis in FIG. 9) by the friction of the friction material 81 in a case where the second plate 20 rotates relative to the first plate 10 in the first direction (for example, at the normal operation of the engine (not illustrated) after the start thereof) from the initial state. In addition, the damper apparatus 100 is configured, as an example, to generate the second hysteresis torque (refer to a region at the negative side of the horizontal axis in FIG. 9) greater than the first hysteresis torque by the friction of the friction material 82 in a case where the second plate 20 rotates relative to the first plate 10 in the second direction (for example, at the start of the engine) from the initial state. Specifically, the damper apparatus 100 is configured, as an example, to generate the first hysteresis torque by the friction between the friction material 81 and the first portion 23 of the second plate 20 without the integral rotation of the second plate 20 and the third plate 30 in a case where the second plate 20 rotates relative to the first plate 10 in the first direction. The damper apparatus 100 is also configured, as an example, to generate the second hysteresis torque by the friction between the friction material 82 and the third plate 30 by the integral rotation of the second plate 20 and the third plate 30 in a case where the second plate 20 rotates relative to the first plate 10 in the second direction.

Here, in a construction where members each of which includes a relatively greater mass (flywheel FW and torque limiter portion 90) are provided at front and rear of the elastic members 70 (input side and output side relative to the elastic members 70) as in the present embodiment, resonance (vibration, noise and the like) generated at the start of the engine (not illustrated) is likely to relatively increase. Thus, at the start of the engine, in order to appropriately reduce a relatively large vibration or noise, it is desirable to generate a relatively large hysteresis torque. Nevertheless, only the generation of relatively large hysteresis torque may not appropriately reduce a relatively small vibration that is generated at the normal operation of the engine (normal driving) after the start thereof. In this case, in the present embodiment as mentioned above, as an example, the friction materials 81 and 82 including the different friction coefficients from each other and the third plate 30 disposed between the friction materials 81 and 82 may generate the hysteresis torque including appropriate magnitude depending on the respective circumstances at the start of the engine and the normal operation after the start of the engine. Thus, the vibration or noise, for example, may be appropriately reduced.

In addition, in the present embodiment, as an example, the pair of third plates 30, the pair of friction materials 81 and the pair of friction materials 82 are provided at opposite sides of the second plate 20 in the axial direction. Accordingly, as an example, the vibration or noise, for example, may be reduced by the pair of third plates 30, the pair of friction materials 81 and the pair of friction materials 82 provided at the opposite sides of the second plate 20 in the axial direction.

Further, in the present embodiment, as an example, the pair of third plates 30 are connected by the connecting member C1 including the axially extending portion P in a state being spaced away from each other in the axial direction. The cut portion 26c including the end surface at the inner side contactable with the axially extending portion P of the connecting member C1 is formed at the portion of the opening portion 26 of the second plate 20 facing the connecting member C1. Accordingly, as an example, the axially extending portion P of the connecting member C1 and the inner end surface of the cut portion 26c are brought to make contact with each other in a case where the second plate 20 rotates in the second direction (see FIG. 8) to thereby easily integrally rotate the second plate 20 and the third plate 30.

The examples of the embodiment of the present invention have been explained in the above, however, the aforementioned embodiment is proposed as an example and not intended to limit the scope of the invention. The above embodiment may be performed in other various modes. Without departing from the spirit of the invention, various omissions, replacements, combinations and changes may be made. The aforementioned embodiment and alternatives thereof are included within the scope and spirit of the invention and included in the invention described in the scope of claims and equivalents thereof. Specifications (configuration, type, direction, shape, size, length, width, thickness, height, quantity, layout, position, material and the like) of each component of the embodiment, for example, may be appropriately changed to be performed.

For example, in the aforementioned embodiment, the example where the damper apparatus is disposed between the engine and the transmission is explained. The present invention, however, is not limited to the aforementioned example. The damper apparatus according to the present invention may be provided between two rotational elements other than the above (between the engine and a rotating electrical machine (motor generator), for example). In addition, the damper apparatus according to the present embodiment may be provided at various vehicles (hybrid automobile, for example) or general machineries including rotational elements, for example.

EXPLANATION OF REFERENCE NUMERALS

10: first plate, 20: second plate, 23: first portion, 24: second portion, 26c: cut portion (opening portion), 30: third plate, 40: fourth plate, 70: elastic member, 81: friction material (first friction material), 82: friction material (second friction material), 90: torque limiter portion, 100: damper apparatus, Ax: rotation axis, C1: connecting member, FW: flywheel (exterior portion), P: axially extending portion

The invention claimed is:

1. A damper apparatus comprising:
a pair of first plates arranged at a position where the pair of first plates is away from each other in an axial direction of a rotation axis, the pair of first plates being configured to be rotatable around the rotation axis in a state where the pair of first plates intersects with the rotation axis;
a second plate including a portion which is positioned at an inner side of the pair of first plates and configured to be rotatable around the rotation axis in a state where the second plate intersects with the rotation axis;
an elastic member elastically deforming in a circumferential direction of the rotation axis by a relative rotation between the pair of first plates and the second plate around the rotation axis;
a first friction material generating a first friction torque in a case where the second plate rotates relative to the pair of first plates in a first direction;
a second friction material generating a second friction torque greater than the first friction torque in a case where the second plate rotates relative to the pair of first plates in a second direction which is opposite from the first direction;
a third plate arranged between the first friction material and the second friction material and configured to be rotatable around the rotation axis in a state where the third plate intersects with the rotation axis;
the second plate and the third plate being inhibited from integrally rotating with each other and the first friction torque being generated by a friction of the first friction material when the second plate rotates relative to the pair of first plates in the first direction; and the second plate and the third plate integrally rotating with each other and the second friction torque being generated by a friction of the second friction material when the second plate rotates relative to the pair of first plates in the second direction.

2. The damper apparatus according to claim 1, wherein the first friction material is arranged between the third plate and the second plate and the second friction material is arranged between the third plate and the pair of first plates, the second plate and the third plate are inhibited from integrally rotating each other and the first friction torque is generated by a friction between the first friction material and the second plate each other in a case where the second plate rotates relative to the pair of first plates in the first direction, the second plate and the third plate integrally rotate each other and the second friction torque is generated by a friction between the second friction material and the third plate each other in a case where the second plate rotates relative to the pair of first plates in the second direction.

3. The damper apparatus according to claim 2, wherein the third plate includes a pair of third plates provided at opposite sides of the second plate in the axial direction of the rotation axis, the first friction material includes a pair of first friction materials provided at opposite sides of the second plate in the axial direction of the rotation axis, and the second friction material includes a pair of second friction materials provided at the opposite sides of the second plate in the axial direction of the rotation axis.

4. The damper apparatus according to claim 3, wherein the pair of third plates is connected in a state being away from each other in the axial direction by a connecting member including an axially extending portion, and an opening portion including an end surface at an inner side is formed at a portion of the second plate facing the connecting member, the end surface being contactable with the axially extending portion of the connecting member.

5. The damper apparatus according to claim 1, further comprising:

a fourth plate configured to rotate integrally with the pair of first plates around the rotation axis, the fourth plate including a portion positioned at an outer side in a radial direction of the rotation axis relative to the elastic member; and a torque limiter portion connected to a portion of the second plate, the portion being positioned at the outer side in the radial direction relative to the elastic member.

* * * * *